Oct. 18, 1927.  
G. PAGANO  
1,645,819  
SAFETY APPARATUS  
Filed June 28, 1926  
3 Sheets-Sheet 2

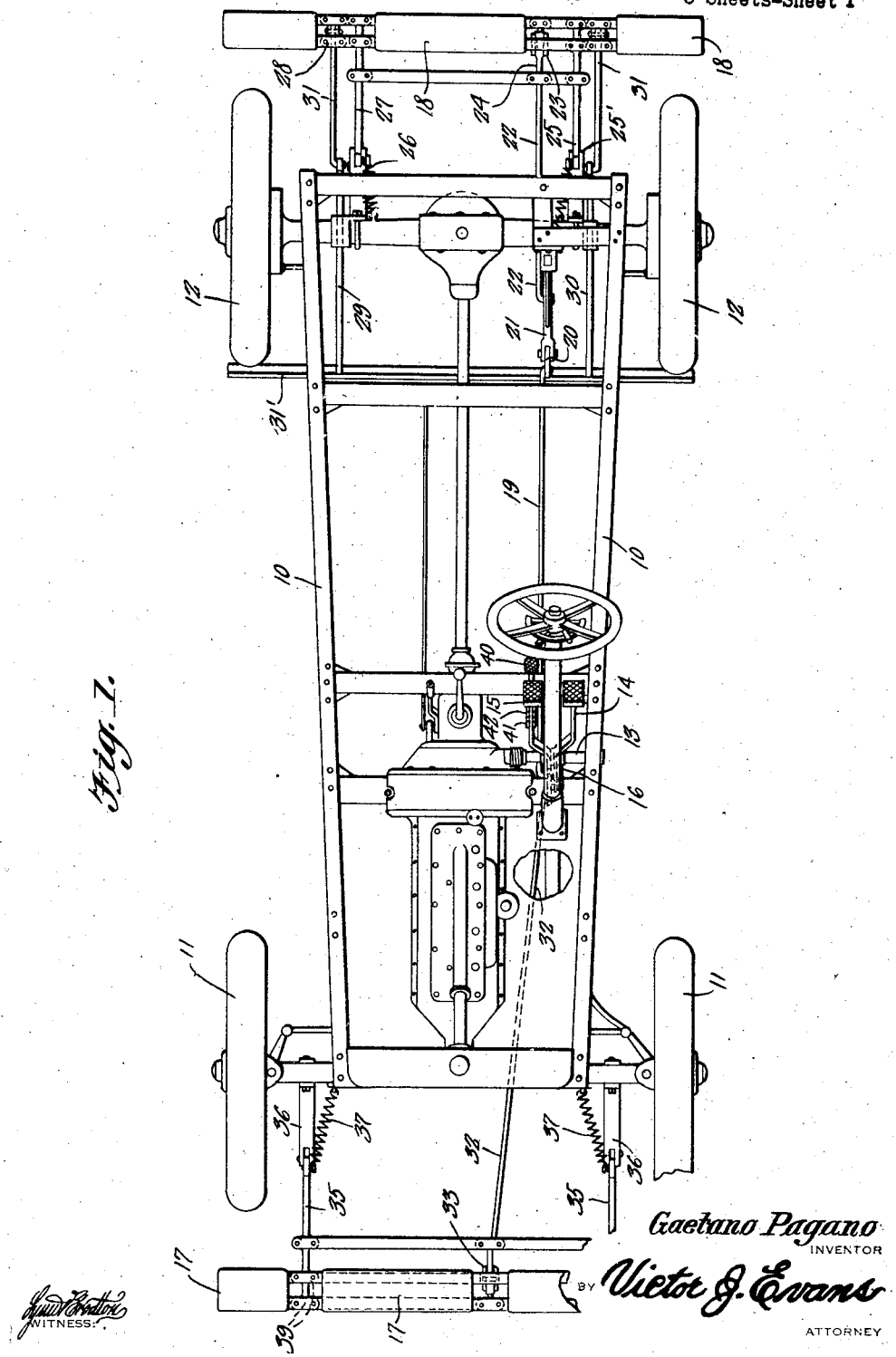

Gaetano Pagano
INVENTOR
BY Victor J. Evans
ATTORNEY

Oct. 18, 1927.

G. PAGANO 1,645,819

SAFETY APPARATUS

Filed June 28, 1926    3 Sheets-Sheet 3

Gaetano Pagano
INVENTOR

BY Victor J. Evans
ATTORNEY

Patented Oct. 18, 1927.

1,645,819

UNITED STATES PATENT OFFICE.

GAETANO PAGANO, OF BROOKLYN, NEW YORK.

SAFETY APPARATUS.

Application filed June 28, 1926. Serial No. 119,180.

This invention relates to improvements in safety apparatus and has particular reference to fenders for motor vehicles.

The principal object of the invention resides in an automobile fender normally supported in a raised position for use as a front and rear bumper, but which operates to prevent the wheels of the vehicles from passing over a person who might accidently be struck down by the same.

Another object of the invention is to provide a fender for automobiles which is automatically moved to a protecting position with respect to the wheels of the vehicle upon the actuation of a safety pedal in cases of emergency and which simultaneously applies the brakes of the vehicles, but which permits the brake pedal to be used for ordinary braking purposes without actuating the fender when bringing the vehicle to an ordinary stop.

A further object of the invention is the provision of a safety appliance for motor vehicles, operable by the depression of an emergency foot pedal, and which automatically operates the brake pedal to place the vehicle under control of the operator when bringing the vehicle to an emergency stop.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a top plan view of my safety apparatus applied to an automobile and showing the parts in normal position.

Figure 4:
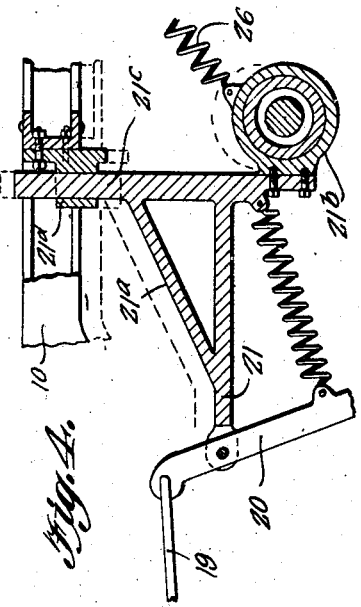
Figures 3 and 4 are detail views of various parts of the apparatus.

Referring more particularly to the drawing, the reference numeral 10 designates the chassis of an automobile, and which includes front wheel 11 and rear wheel 12. A shaft 13 is journaled in the chassis frame and on which the brake pedal 14 and safety pedal 15 are loosely mounted. An arm 16 extends from the brake pedal 14 and is operatively connected by a pin and slot connection through a link 16' to the safety pedal 15 below the shaft 13. Normally the pin of the pin and slot connection is at one end of the slot in the link 16' which permits the brake pedal 14 to be depressed to apply the brakes of the vehicle without imparting any movement to a safety pedal 15. However, upon depression of the safety pedal 15, the link 16' will exert a pull upon the arm 16 thus simultaneously applying the brakes with the operation of the safety devices now to be described.

Operatively connected with the brake pedal 14 are front and rear fender mechanisms 17 and 18 respectively, which are normally held in a raised position to act as bumpers, but which are movable to a position adjacent the respective wheels to prevent the wheels from accidentally passing over a person who might be struck down by the vehicle.

The mechanism 18 comprises a rod 19 having one end pivotally connected to the free end of the brake pedal 14, while the other end of the rod is pivotally connected to one end of a lever 20 mounted on the forwardly extending arm 21 of a bracket 21$^a$ carried by a clamp 21$^b$ on the rear axle housing of the mechanism. The bracket member is rigidly mounted with respect to the axle housing, and the vertical arm 21$^c$ thereof is slidable with respect to the chassis frame within a bearing eye 21$^d$ secured to the frame to allow for the movement thereof when travelling over uneven surfaces. The other end of the lever 20 connects with one end of a rod 22, which rod is connected with a carriage 23 slidably mounted in a U-shaped bracket 24 supported on one of the legs of a bell crank lever 25. The lever 25 is pivotally supported by an arm 25' which extends from the bracket mounted on the axle housing. The carriage 23 is normally disposed at the outer end of the bracket 24, but moves toward the inner end upon movement of the rod 22 in the direction of the arrow, shown in Figure 2 of the drawings. As the carriage reaches the limit of its forward movement along the bracket, it strikes the inner wall of the same and the further pull upon the rod 22 will cause the rocking of the bell crank lever 25 to move the same to the dotted position, shown in Figure 2 of the drawings. A contractile spring 26 is connected to the bell crank lever and to a stationary part of the vehicle to normally hold the lever in a raised position. A pivoted arm 27 is mounted in horizontal alignment with the lever 25, and supported by the said arm and said lever, are transverse bars 28, which extend beyond the sides of the rear wheel 12, as shown in Figure 1 of the drawings and constitute a fender for the rear end of the vehicle. These bars may be covered with a suitable resilient material for cushioning purposes.

Pivotally mounted beneath the rear axle housing are arms 29 and 30, the same having pivotal connection with rod 31, which in turn are connected with the fender 18 for transmitting motion from the fender to the said arms, to cause the same to move downward to the dotted position upon the actuation of the brake pedal. A transverse bar 31' is supported from the forward ends of the arms 29 and 30 and which arms normally support the bar in a raised position forward of the rear wheels 12, so that when the same is lowered to the dotted position in Figure 2, it serves as a fender therefor.

The front fender mechanism 17 is somewhat similar in construction to a certain portion of the rear fender mechanism and comprises a rod 32 which is pivotally connected to the lower end of the brake pedal 14 and extends forward beyond the front of the vehicle for connection with a carriage 33 movable over a U-shaped bracket 34. Bell crank levers 35 are pivotally mounted upon arms 36 extending from the front axle. The levers are normally held in a raised position by contractile springs 37 which have their ends connected to the chassis frame. Said levers support a plurality of transversely disposed bars 39, which extend beyond the sides of the front wheels 11. The front fender mechanism is normally held in a raised position, as shown in full lines in Figure 2 of the drawings, but is movable to the dotted position upon the actuation of the brake pedal. The bars 39 may be covered with a resilient material for cushioning purposes.

Figure 2:
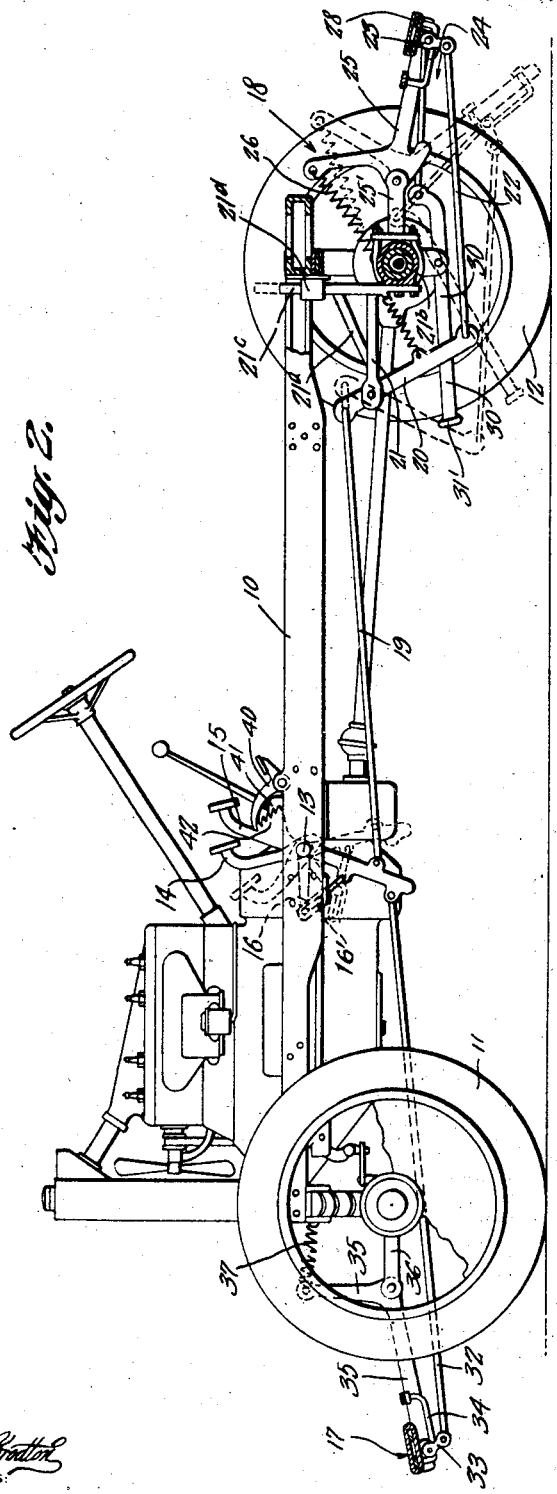
Figure 2 is a side elevation of the same and showing in dotted lines the position of the parts when in operative position.
Figure 3:
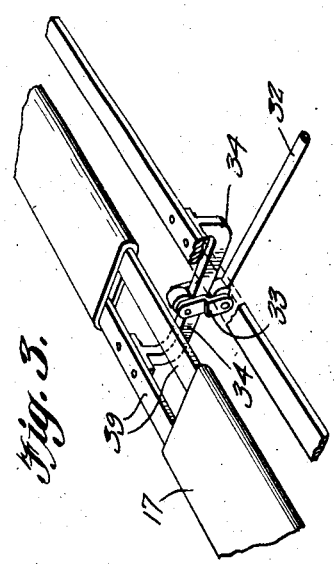
Figures 5, 6:
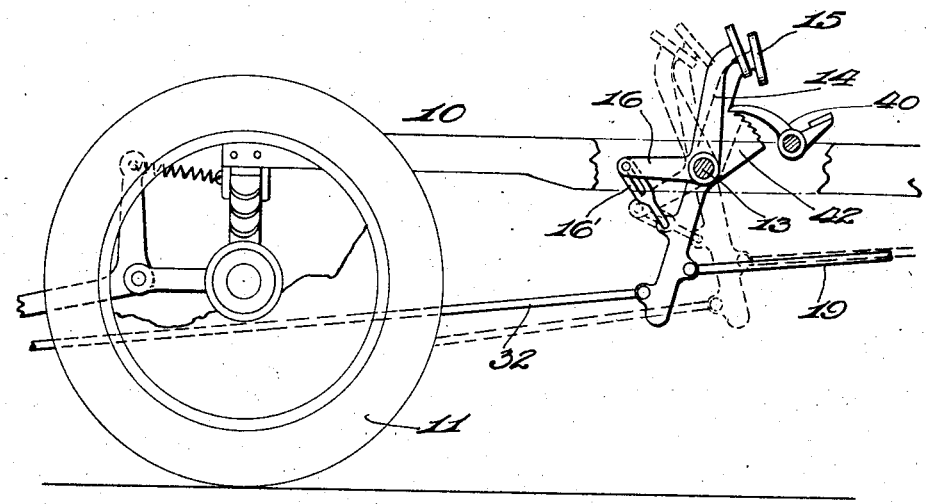
Figure 5 is an enlarged side elevation with parts broken away in section to show the foot actuating mechanism.
Figure 6 is an end elevation of the foot actuating mechanism.

In the operation of the apparatus, we shall presume that an emergency arises when the mechanisms 17 and 19 are to be moved to the dotted line positions shown in Figure 2. The operator presses downward upon the safety pedal 15 with his foot, which simultaneously actuates the brake pedal 14 and applies the brakes in the usual manner, at which time, the rod 19 exerts a pushing force upon the lever 20 causing a pull upon the rod 22, which operates to move the carriage 23 to the inner end of the bracket 24. As the carriage strikes the inner end of the bracket, the lever 25 will be pulled down against the tension of the spring 26, thus moving the transverse bars 28 to a position adjacent the ground for preventing the rear wheels from passing over the object or person while the vehicle is being operated in a backward direction. Simultaneous with the movement of the lever 25, the rod 31 will force the lever 30 downwards, causing the transverse bar 31' to protect the front of the rear wheels. The front fender mechanism will be operated simultaneously with the mechanism 18, as the rod 32 is pulled backwards, causing the carriage to actuate the lever 35 to move the transverse bars 39 to a position forward of the front wheels. When it is desired to retain mechanisms in their operative positions, a pawl 40 is engaged with the ratchet teeth 41 provided on a segment 42 extending from the safety pedal 15. The pawl 41 is foot actuated so that it may be released by the operator upon the depression of the same to gradually permit the pedal 15 to return to normal position.

The device is operable upon the depression of the safety pedal, and it will be appreciated that the brake pedal may be depressed without affecting the operation of the fenders. The said fenders are not actuated until after the carriages have reached the inner ends of their supporting brackets. It will therefore be appreciated that the device will not actuate every time the brakes of the vehicle are applied, but only in cases of emergency upon the application of the emergency safety pedal 15.

While I have shown and described what I consider to be the most desirable embodiment of my invention, it is obvious that many of the details may be varied without in any way departing from the spirit of my invention, and I therefore do not limit myself to the exact details of construction herein set forth, nor to anything less than the whole of my invention limited only by the appended claims.

What is claimed as new is:—

1. In combination with a motor vehicle having a pedal, a front fender, a rear fender, means for normally holding said fenders in a raised position to act as front and rear bumpers respectively, and respective means operable upon the manual depression of said pedal for simultaneously moving said fenders to an operative position adjacent the ground over which the vehicle is adapted to pass.

2. In combination with a motor vehicle having a brake pedal, a front fender for movement to a position in advance of the front wheels of the vehicle, a rear fender for movement to a position behind the rear wheels of said vehicle, a rear fender for movement in advance of the rear wheels of said vehicle, means for normally holding all of said fenders in a raised inoperative position, separate actuating means respectively connected with said pedal and said front fender and said first rear fender whereby depression of said pedal will cause simultaneous movement of said fenders to an operative position, and means responsive to the action of one of said actuating means for moving the other of the rear fenders to an operative position.

3. In combination with a motor vehicle having a brake pedal, a safety pedal, front and rear fenders swingingly mounted at opposite ends of said motor vehicle, means for normally holding said fenders in a raised inoperative position, and co-acting means between said brake pedal and said safety pedal for depression of the same to simultaneously apply the brakes upon depression of the safety pedal by the foot of an operator to operate said front and rear fenders.

4. In combination with a motor vehicle having a brake pedal, a safety pedal, front and rear fenders swingingly mounted at opposite ends of said motor vehicle, means for normally holding said fenders in a raised inoperative position, co-acting means between said brake pedal and said safety pedal for depression of the same to simultaneously apply the brakes upon depression of the safety pedal by the foot of an operator, and means for locking said brake pedal and safety pedal in a depressed position to hold said fenders in an operative position.

In testimony whereof I affix my signature.

GAETANO PAGANO.